(12) United States Patent
Le et al.

(10) Patent No.: US 7,475,226 B2
(45) Date of Patent: Jan. 6, 2009

(54) SYSTEM FOR MANAGING DATA DEPENDENCY USING BIT FIELD INSTRUCTION DESTINATION VECTOR IDENTIFYING DESTINATION FOR EXECUTION RESULTS

(75) Inventors: Hung Q. Le, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 11/533,379

(22) Filed: Sep. 20, 2006

(65) Prior Publication Data

US 2008/0072018 A1    Mar. 20, 2008

(51) Int. Cl.
*G06F 9/30* (2006.01)
(52) U.S. Cl. ...................... 712/218; 712/217

(58) Field of Classification Search ................. 712/216, 712/217
See application file for complete search history.

(56) References Cited

U.S. PATENT DOCUMENTS

| 4,903,196 | A | * | 2/1990 | Pomerene et al. ........... 712/217 |
| 5,487,156 | A | * | 1/1996 | Popescu et al. ............. 712/217 |

* cited by examiner

*Primary Examiner*—Richard Ellis
(74) *Attorney, Agent, or Firm*—Libby Z. Handelsman; Dillon & Yudell LLP

(57) ABSTRACT

A method of data processing includes fetching a sequence of instructions, assigning each instruction within the sequence a respective unique instruction tag, and associating a respective destination vector with each instruction. The destination vectors, which are of uniform size, identify which of a plurality of possible destinations for execution results are targeted by the associated instructions. Data dependency between instructions in the sequence is managed by reference to the destination vectors associated with the instructions.

18 Claims, 2 Drawing Sheets

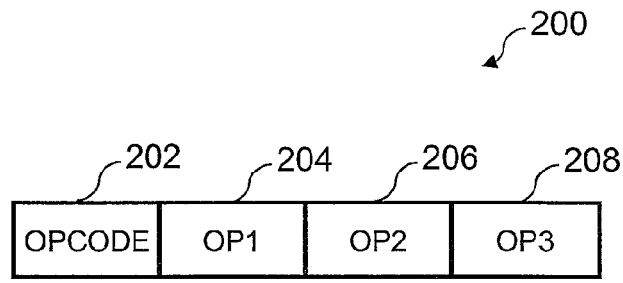
*Figure 2A*
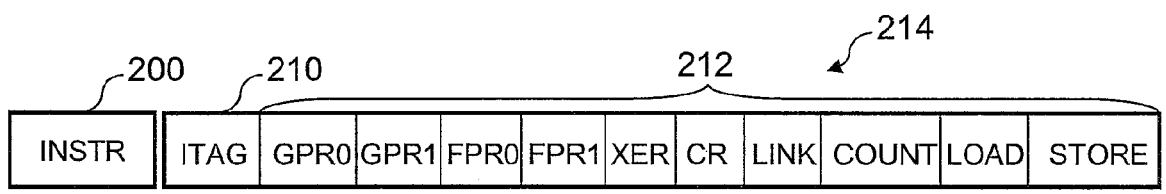
*Figure 2B*
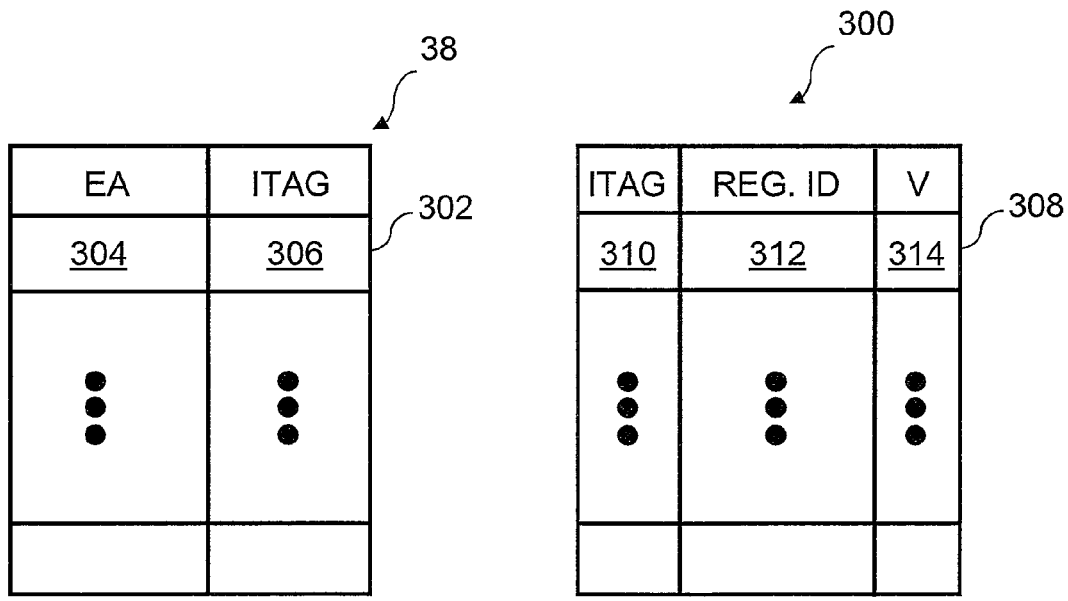
*Figure 3A*          *Figure 3B*

SYSTEM FOR MANAGING DATA DEPENDENCY USING BIT FIELD INSTRUCTION DESTINATION VECTOR IDENTIFYING DESTINATION FOR EXECUTION RESULTS

BACKGROUND OF THE INVENTION

1. Technical Field

The present invention relates in general to data processing and, in particular, to data processing in a processor. Still more particularly, the present invention relates to the use of instruction destination tags within a processor.

2. Description of the Related Art

In conventional superscalar processors, instructions are executed in parallel in multiple execution units, possibly out-of-order with respect to the predefined program order. As the instructions are executed, results of execution are generated and buffered at various locations within the processor for later reference. Because subsequent instructions are often dependent upon the results of previous instructions, a dependency tracking scheme is generally employed to ensure that all data dependencies between instructions are observed.

In one prior art implementation, dependencies between instructions are managed through the use of multiple different destination tags. In such prior art implementations, a different destination tag is defined for each location within the processor that will be updated as a result of instruction execution. Comparison of destination tags of the various instructions thus permits the processor to detect and observe dependencies between instructions. However, the total number of destination tags that must be tracked and routed within the prior art processor is potentially equal to the product of the number of instructions in flight multiplied by the number of destinations of the instruction results. Tracking and routing such a large number of destination tags within the processor entails considerable circuitry within the processor and consumes significant power.

In view of the shortcomings of prior art techniques of dependency tracking within conventional processors, the present invention recognizes that it would be useful and desirable to provide an improved processor and method of dependency tracking within a processor utilizing instruction destination tags.

SUMMARY OF THE INVENTION

A method of data processing includes fetching a sequence of instructions, assigning each instruction within the sequence a respective unique instruction tag, and associating a respective destination vector with each instruction. The destination vectors, which are of uniform size, identify which of a plurality of possible destinations for execution results are targeted by the associated instructions. Data dependency between instructions in the sequence is managed by reference to the destination vectors associated with the instructions.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 2A illustrates an exemplary instruction format in accordance with the present invention;

FIG. 2B depicts an exemplary embodiment of an instruction tag (ITAG) and destination vector (D_Vector) in accordance with the present invention;

FIG. 3A illustrates a more detailed view of a global completion table in accordance with one embodiment of the present invention; and FIG. 3B depicts a more detailed view of a mapping table in a register mapper in accordance with one embodiment of the present invention.

DETAILED DESCRIPTION OF ILLUSTRATIVE EMBODIMENT

Figure 1:
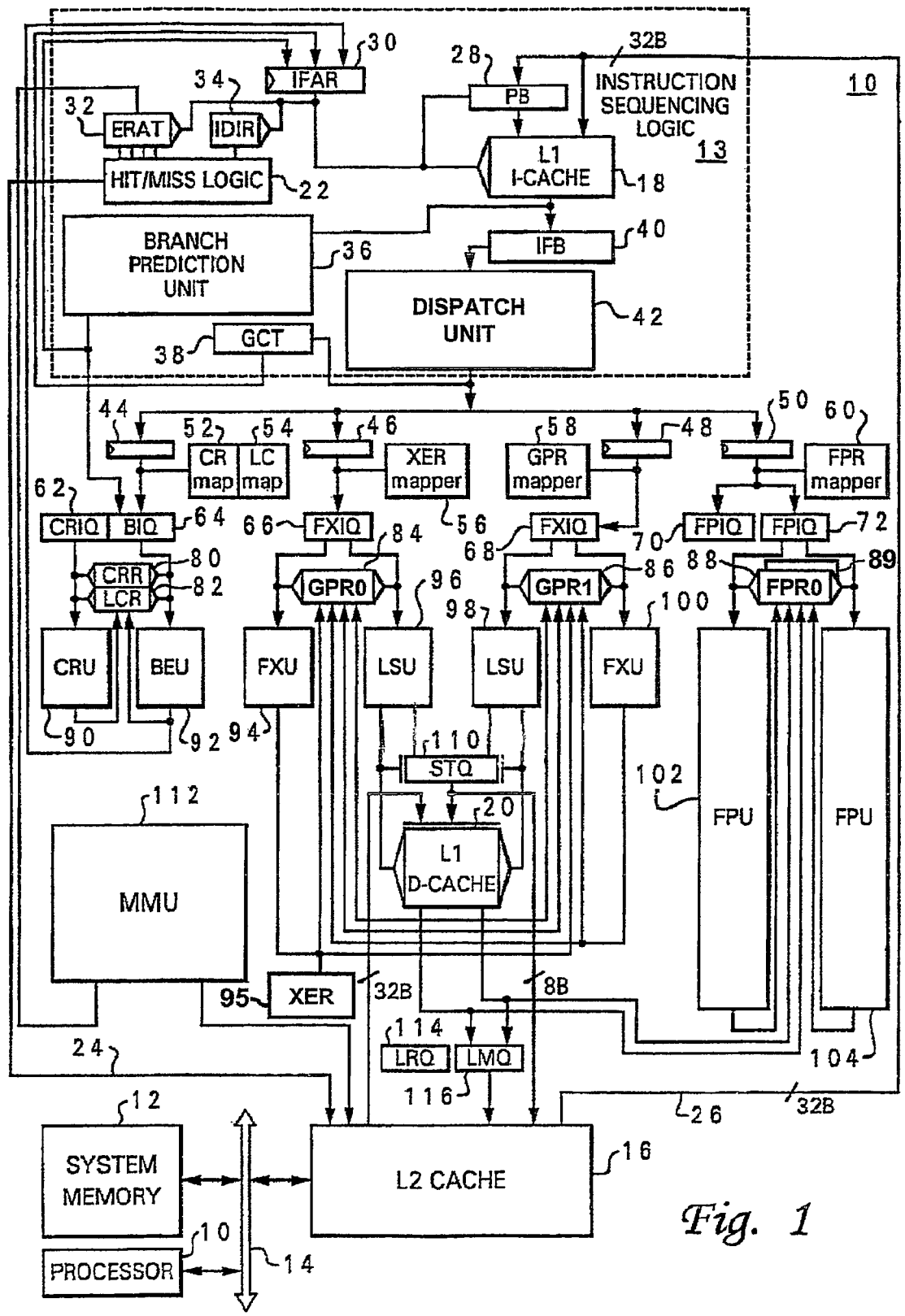
FIG. 1 is a high level block diagram of a data processing system in accordance with the present invention.

With reference now to the figures and in particular with reference to FIG. 1, there is depicted a high level block diagram of an illustrative embodiment of a processor, indicated generally at 10, for processing instructions and data in accordance with the present invention. In particular, processor 10 employs an improved universal instruction tagging mechanism to track and observe instruction dependencies.

Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. As illustrated in FIG. 2, a typical instruction 200 includes an operation code (opcode) field 202 identifying an operation to be performed and, optionally, one or more operand fields (labeled OP1, OP2 and OP3) 204-208 indicating an immediate operand and/or operand source (e.g., architected register identifier) and/or destination register (e.g., architected register identifier).

In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by these sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns or, as discussed in greater detail below, by block prefetch unit 35 in response to detection of a known sequence of instruction blocks. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the cache line specified by the EA in IFAR 30 resides in L1 cache 18, L1 I-cache 18 outputs the instructions within the cache line to both branch prediction unit (BPU) 36 and to instruction fetch buffer (IFB) 40. Each such fetched instruction is assigned an instruction tag (ITAG) uniquely identifying the instruction within processor 10. For example, in an embodiment in which processor 10 is designed to support 256 instructions "in flight" concurrently, an 8-bit ITAG may be employed.

BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the fetched instructions received from L1 I-cache 18 (and their associated ITAGs) and then passes the instructions (including their ITAGs) to dispatch unit 42. Dispatch unit 42 assigns each fetched instruction 200 a destination tag. As shown in FIG. 2B, the destination tag preferably takes the form of a destination vector (D_Vector) 212 that in combination with the ITAG 210 already assigned to instruction 200 forms a combination tag 214. As shown, each D_Vector 212 is preferably implemented as a uniform length bit vector including a 1-bit bit field for each possible destination of results of the execution of the associated instruction. In the exemplary embodiment, these destinations include two general-purpose register files (GPR0, GPR1) 84, 86, two floating-point register files (FPR0, FPR1) 88, 89, a fixed-point Exception Register file (XER) 95, condition register file (CRR) 80, a link register within link and count register file (LCR) 82, a count register within LCR 82, the load port of L1 D-cache 20, and the store port of L1 D-cache 20. Dispatch unit 42 decodes each instruction to determine the path by which the instruction should be dispatched for execution and the destination(s) of results of execution of the instruction. Dispatch unit 42 asserts the appropriate bit within D_Vector 212 for each destination of execution results. It should be appreciated that at least some instructions will have multiple bits asserted within the associated D_Vector 212. For example, a fixed-point instruction may update both GPR0 84 and GPR1 86, XER 95, and CRR 80 and accordingly have 4 bits asserted within its D_Vector 212.

After dispatch unit 42 assigns an instruction a D_Vector 212 to an instruction, dispatch unit 42 enters information regarding the instruction in global completion table (GCT) 38 and into the relevant mapper(s) 52-60. As indicated in FIG. 3A, GCT 38 includes one entry 302 for each instruction that can concurrently be undergoing processing between the dispatch and completion stages of instruction processing. Each entry 302 includes an effective address (EA) field 304 for buffering the effective address of the cache line containing the instruction, an ITAG field 306 for buffering the ITAG of the instruction. In one embodiment, GCT 38 further assigns each instruction to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

As noted above, instruction information for an instruction is also recorded within the specific ones of mappers 52-60 associated with the destination(s) of the instruction results. In one embodiment of the present invention, instruction information is recorded by each of mappers 52-60 within a respective mapping table 300 such as that illustrated in FIG. 3B. As depicted, mapping table 300 has a plurality of entries 308, each including a respective ITAG field 310, a register ID field 312, and a valid field 314.

At dispatch time, dispatch unit 42 dispatches eligible instructions together with their combination tags 214 in-order to latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Dispatch unit 42 also records the ITAG of each instruction within the ITAG field 310 of an entry 308 in each of the mappers 52-60 indicated by the D_Vector 212 of the instruction. For example, if the GPR0 bit of D_Vector 212 is asserted, then the ITAG 210 is written into ITAG field 310 of an entry 308 in the mapping table 300 of GPR mapper 58, and if the XER bit of D_Vector 212 is asserted, then ITAG 210 is written into ITAG field 310 of an entry 308 in the mapping table 300 of XER mapper 56.

At this time, each instruction requiring a rename register for temporarily storing execution results is also assigned one or more registers within a register file by the appropriate one of mappers 52-60 based upon the asserted bits within the instruction's D_Vector 212. CR mapper 52, link and count (LC) register mapper 54, exception register (XER) mapper 56, general-purpose register (GPR) mapper 58, and floating-point register (FPR) mapper 60 thus assign rename registers within CRR 80, LCR 82, XER 95, GPRs 84, 86 and FPRs 88, 89, respectively. The register ID field 314 is thus populated, if necessary, by the appropriate mapper(s) at this time.

At dispatch time, the dispatch unit 42 also scans the ITAG field 310 and register ID field 312 of all earlier entries 308 of mapping tables 300 to detect which previous instruction(s), if any, in the program sequence the current instruction to be dispatched is data-dependent upon. Dependent ITAGs, if any, are read from the mapping tables 300 of mappers 52-60 and forwarded with the instruction to the relevant one of CR issue queue (CRIQ) 62, branch issue queue (BIQ) 64, fixed-point issue queues (FXIQS) 66 and 68, or floating-point issue queues (FPIQs) 70 and 72. If no data dependency exists, the instruction is eligible for issue to the relevant one of execution units 90-104. If an unresolved data dependency is detected, the instruction waits at the relevant one of issue queues 62-72 until the issue queue is notified by the relevant execution unit(s) 90-104 that the previous instruction(s) upon which the instruction is data-dependent have all finished execution. When execution of the older instruction(s) has finished, as indicated, for example, by receipt of the associated ITAG(s) from the relevant execution unit(s) 90-104, the formerly data-dependent instruction becomes eligible for issue from the issue queue to the execution unit. Instructions can be issued opportunistically (i.e., possibly out-of-order) from issue queues 62, 64, 66, 68, 70 and 72 to the execution units of processor 10 for execution.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90-104 is preferably implemented as an execution pipeline having a number of pipeline stages. Of course, in other embodiments, additional types of execution units, such as a vector execution unit, can be implemented.

During execution within one of execution units 90-104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register files (FPRs) 88, 89, which like GPRs 84 and 86 are also preferably implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution unit provides results of execution to each of the destinations identified by the instruction's D_Vector 212. For example, in the case of the exemplary fixed-point instruction noted above, which has a D_Vector 212 in which the bit fields corresponding to GPR0 84, GPR1 86, XER 95, and CRR 80 are all asserted, FXU 94 routes the data results to GPR0 84 and GPR1 86, routes exception results to XER 95, and routes condition results to CRR 80 by reference to the asserted bit fields of D_Vector 212.

After an execution unit finishes execution of an instruction, the execution unit further reports the finishing ITAG 210 and its D_Vector 212 to mappers 52-60 and to the relevant one(s) of issue queues 62-72. An issue queue receiving a finishing report compares the finishing ITAG 210 and D_Vector 212 with the corresponding fields 310, 312 of any queued instructions having a data dependency. If a match is found, then the dependency is resolved, and the formerly data-dependent instruction becomes eligible for issue from the issue queue to the execution unit.

Mappers 52-60 utilize the finishing information to update the status of physical destination registers in the register files. A mapper 52-60 receiving a finishing report qualifies the information as relevant to that mapper by reference to the finishing D_Vector 212. If the finishing report is relevant to that mapper, the mapper compares the finishing ITAG 210 with the ITAG fields 310 in the mapper table 300. If a match is found, valid field 314 is set to indicate that the instruction associated with the ITAG in that entry 308 has finished execution, and the data is available for use by younger dependent instruction that may now proceed to issue for execution.

After execution of an instruction finishes, the execution unit also notifies GCT 38 of at least the instruction's ITAG. In response, GCT 38 schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. Once all instructions within its instruction group have completed, its entry is removed from GCT 38. It should be noted that the D_Vector 212 of an instruction is thus inherently deallocated with the instruction's ITAG 210.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, its entry can be removed from GCT 38.

Following execution of a load instruction (including a load-reserve instruction), the effective address computed by executing the load instruction is translated to a real address by a data ERAT (not illustrated) and then provided to L1 D-cache 20 as a request address based upon the asserted bit field in the D_Vector 212. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. Again, an LSU 96 or 98 routes store data to store queue 110 based upon an asserted STORE bit field within the D_Vector 212. From STQ 110, data can be stored into either or both of L1 D-cache 20 and L2 cache 16, following effective-to-real translation of the target address.

As has been described, the present invention provides an improved universal destination tag for instruction under processing in a processor. In accordance with the present invention, each instruction in a sequence of instruction processed in a processor is assigned a destination tag implemented as a uniform length bit vector that indicates which of multiple possible destination of execution results are to receive execution results of the instruction. For certain instructions, multiple bit fields of the bit field may be asserted to indicate that the instruction has multiple different destinations for its execution results. The destination tags of the present invention are employed in a dependency tracking facility within the processor (e.g., dispatch unit 42 and mappers 52-60) to ensure that dependencies between instructions are observed. In addition, the destination tags are referenced to allocate appropriate resources (e.g., rename registers) to instructions and to track where execution results are to be routed when instruction execution is finished.

While the invention has been particularly shown as described with reference to a preferred embodiment, it will be understood by those skilled in the art that various changes in form and detail may be made therein without departing from the spirit and scope of the invention.

What is claimed is:

1. A method of data processing, comprising:
    fetching a sequence of instructions;
    assigning each instruction within the sequence a respective unique instruction tag;
    associating a respective destination vector with each instruction in the sequence, wherein all destination vectors are of uniform size and each destination vector includes a plurality of bit fields each corresponding to a respective one of a plurality of possible destinations for execution results, wherein the associating further includes:
        decoding a given instruction in the sequence to determine one or more destinations among the plurality of possible destinations for an execution result of the given instruction; and
        asserting the respective bit field corresponding to each of the one or more destinations determined by the decoding; and
    managing data dependency between instructions in the sequence by reference to the destination vectors associated with the instructions.

2. The method of claim 1, and further comprising:
    assigning at least one register in the processor to the given instruction based upon the one or more asserted bit fields in the instruction's associated destination vector.

3. The method of claim 1, and further comprising:
    an execution unit of the processor executing the given instruction in the sequence and reporting the execution result to the one or more destinations based upon the destination vector of the given instruction.

4. The method of claim 1, and further comprising:
    automatically retiring a destination vector of an instruction together with the instruction tag of the instruction.

5. The method of claim 1, wherein managing data dependency comprises:
    determining if a destination vector of a subsequent instruction in the sequence matches that of a previous instruction in the sequence; and
    in response to an affirmative determination, delaying execution of the subsequent instruction until an execution result of the earlier instruction is obtained.

6. The method of claim 1, wherein said plurality of possible destinations includes a plurality of register files.

7. The method of claim 6, wherein the plurality of register files includes a first register file for storing fixed-point operands and a second register file for storing floating-point operands.

8. The method of claim 1, wherein said asserting comprises asserting multiple bit fields in the destination vector of the given instruction.

9. A processor, comprising:
    one or more execution units that execute instructions to generate execution results;
    a plurality of possible destinations for execution results;
    instruction sequencing logic that fetches a sequence of instructions, assigns each instruction within the sequence a respective unique instruction tag and associates a respective destination vector with each instruction, wherein all destination vectors are of uniform size and each includes a plurality of bit fields each corresponding to a respective one of the plurality of possible destinations, wherein the instruction sequencing logic decodes a given instruction to determine one or more destinations for an execution result of the given instruction and asserts the respective bit field of each of said one or more destinations determined by the decoding; and
    a dependency tracking facility that manages data dependency between instructions in the sequence by reference to the destination vectors associated with the instructions.

10. The processor of claim 9, wherein:
    said plurality possible destinations includes a plurality of register files;
    the processor further includes a mapper that assigns at least one register in one of the plurality of register files to the given instruction based upon the one or more asserted bit fields in the given instruction's associated destination vector.

11. The processor of claim 9, wherein an execution unit of the one or more execution units reports the execution result to the one or more destinations among the plurality of possible destinations based upon the destination vector.

12. The processor of claim 9, wherein the instruction sequencing logic automatically retires a destination vector of an instruction together with the instruction tag of the instruction.

13. The processor of claim 9, wherein the dependency tracking facility manages data dependency by determining if a destination vector of a subsequent instruction in the sequence matches that of a previous instruction in the sequence and, if so, delays execution of the subsequent instruction until an execution result of the earlier instruction is obtained.

14. The processor of claim 9, wherein the instruction sequencing logic includes the dependency tracking facility.

15. A data processing system, comprising:
    a processor in accordance with claim 9;
    a memory coupled to the processor; and
    an interconnect fabric coupled to the processor.

16. The processor of claim 9, wherein said plurality of possible destinations includes a plurality of register files.

17. The processor of claim 16, wherein the plurality of register files includes a first register file for storing fixed-point operands and a second register file for storing floating-point operands.

18. The processor of claim 9, wherein the processor asserts multiple bit fields in the destination vector of the given instruction.

* * * * *